United States Patent
Ozawa et al.

(10) Patent No.: US 6,789,993 B2
(45) Date of Patent: Sep. 14, 2004

(54) FASTENER FOR CLAMPING MEMBERS HAVING A CERTAIN SPACING FROM EACH OTHER WHILE MAINTAINING THE CERTAIN SPACING THEREBETWEEN

(75) Inventors: Junzo Ozawa, Aichi (JP); Shuji Ito, Aichi (JP); Mitsushige Gotou, Wako (JP)

(73) Assignees: Aoyama Seisakusho Co., Ltd., Aichi (JP); Honda Giken Kogyo Kabushiki Kaisha, Tokyo (JP)

(*) Notice: Subject to any disclaimer, the term of this patent is extended or adjusted under 35 U.S.C. 154(b) by 121 days.

(21) Appl. No.: 10/089,272
(22) PCT Filed: Jul. 26, 2001
(86) PCT No.: PCT/JP01/06421
§ 371 (c)(1), (2), (4) Date: Mar. 26, 2002
(87) PCT Pub. No.: WO02/10595
PCT Pub. Date: Feb. 7, 2002

(65) Prior Publication Data
US 2002/0150445 A1 Oct. 17, 2002

(30) Foreign Application Priority Data
Jul. 28, 2000 (WO) .............................. PCT/JP00/05035

(51) Int. Cl.[7] .............................................. F16B 43/02
(52) U.S. Cl. ...................................... 411/546; 411/432
(58) Field of Search ................................. 411/178, 535, 411/546, 432, 433, 307–310, 304

(56) References Cited

U.S. PATENT DOCUMENTS

| | | | |
|---|---|---|---|
| 2,842,180 A | * | 7/1958 | Brown |
| 3,294,139 A | | 12/1966 | Preziosi |
| 3,498,352 A | | 3/1970 | Duffy |
| 3,554,258 A | | 1/1971 | Duffy |
| 3,579,684 A | | 5/1971 | Duffy |
| 3,787,222 A | | 1/1974 | Duffy |
| 3,858,262 A | | 1/1975 | Duffy |
| 3,896,760 A | | 7/1975 | Duffy |
| RE28,812 E | | 5/1976 | Duffy |
| 3,995,074 A | | 11/1976 | Duffy et al. |
| 4,043,239 A | | 8/1977 | DeFusco |
| 4,054,688 A | | 10/1977 | Duffy et al. |
| 4,100,882 A | | 7/1978 | Duffy et al. |
| 4,120,993 A | | 10/1978 | Duffy et al. |
| 4,682,906 A | * | 7/1987 | Ruckert |
| 5,288,191 A | | 2/1994 | Ruckert et al. |
| 6,135,689 A | * | 10/2000 | Matsunami |
| 6,357,953 B1 | * | 3/2002 | Ballantyne |
| 6,431,602 B1 | * | 8/2002 | Ralko |

FOREIGN PATENT DOCUMENTS

| | | | |
|---|---|---|---|
| DE | 91 12 424.7 | * | 1/1992 |
| DE | 42 20 842 A1 | | 1/1994 |
| DE | 44 26 785 C1 | | 7/1994 |
| FR | 2 570 769 A1 | | 3/1986 |

* cited by examiner

*Primary Examiner*—Flemming Saether
(74) *Attorney, Agent, or Firm*—Frishauf, Holtz, Goodman & Chick, P.C.

(57) ABSTRACT

A fastener for members (M1, M2) to be clamped with a certain spacing therebetween includes a nut (10); a bolt (40); and a moveable collar (20) having in an inner bore thereof a torque transmitting device capable of transmitting torque of the bolt, which is axially inserted into the inner bore, to the movable collar through thread—thread engagement, and wherein a portion of the thread of the bolt includes special thread ridges (422), by which a frictional force is imparted to the thread—thread engagement.

7 Claims, 4 Drawing Sheets

$\alpha, \beta$: FLANK ANGLE ($\alpha < \beta$)

US 6,789,993 B2

FASTENER FOR CLAMPING MEMBERS HAVING A CERTAIN SPACING FROM EACH OTHER WHILE MAINTAINING THE CERTAIN SPACING THEREBETWEEN

This application is a U.S. National Phase Application under 35 USC 371 of International Application PCT/JP01/06421 (not published in English) filed Jul. 26, 2001.

TECHNICAL FIELD

The invention relates to a fastener capable of clamping members, which are to be clamped and are spaced a certain spacing from each other, while maintaining a clearance therebetween and absorbing some possible scatter in the spacing or some possible axial deviation.

BACKGROUND OF THE INVENTION

U.S. Pat. No. 5,288,191 for Edvald Rucker et al discloses a conventional fastener of the same kind as described above, which fastener involves a high manufacturing cost since it is composed of many constituent elements and a part of the elements is special in shape. Further, since forces required for movements of the constituent elements for holding of a predetermined spacing rely on a pushing force of and torque of a bolt-like member inserted into the constituent elements under frictions, an operator for performing clamping of the fastener is required to rotate the bolt-like member while applying a pushing force, so that handling of the fastener is complicated. In addition, since the fastener has no positive loosening preventive function, application of the fastener has been difficult under circumstances under much vibrations.

DISCLOSURE OF THE INVENTION

The invention has been devised in order to solve the above-mentioned problem of prior fasteners, and this problem can be solved by a fastener for members (M1, M2) to be clamped with a certain spacing therebetween, the fastener comprising a nut (10) having one end surface of a substantially cylindrical-shaped main body adapted to be latched by one (M1) of the members to be clamped, the nut being formed on an inner peripheral surface thereof with a first thread (13) comprising an internal thread capable of threading onto a thread of a bolt (40) and a second thread (14) comprising aninternal thread inverse to thread ridges of the thread of the bolt and capable of threading onto a first thread (21) of a movable collar (20) comprising an external thread, which is formed on an outer peripheral surface of a substantially cylindrical-shaped main body of the movable collar (20) and is inverse to thread ridges of the thread of the bolt; the movable collar (20) having in an inner bore thereof a torque transmitting means capable of transmitting torque of the bolt, which is inserted axially into the inner bore, to the movable collar through thread—thread engagement; and the bolt (40) having a shank (42), on an outer peripheral surface of which is formed a thread comprising an external thread capable of threading into the first thread (13) of the nut; and wherein a portion of the thread of the bolt comprises special thread ridges (422), by which a frictional force greater than that obtained in engagement between normal threads is imparted to the thread—thread engagement.

BEST MODE FOR CARRYING OUT THE INVENTION

Figure 1:
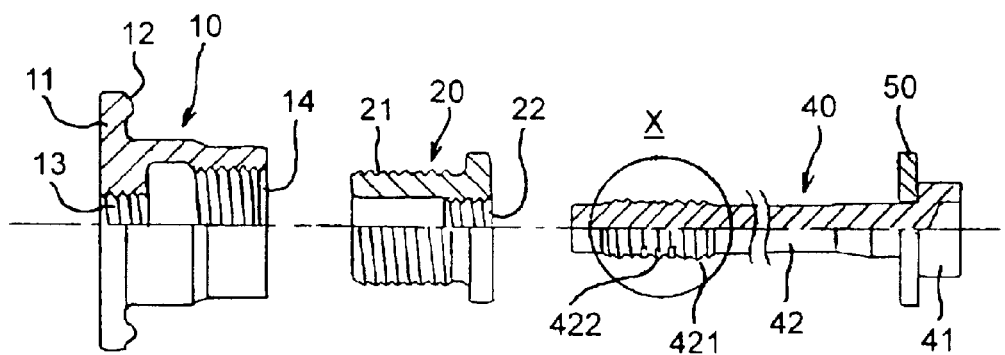
FIG. 1 is a partial, cross sectional view showing a first embodiment of the invention.

The invention will be described below in detail with reference to the drawings.

The invention is essentially composed of a nut 10 having on one end surface of a substantially cylindrical-shaped body thereof a flange 11, of which rotation about an axis is restricted by one (first member) (M1) of members to be clamped, and formed on its inner peripheral surface with a first thread (13) (an internal thread formed on a central opening of the flange and being a right-hand thread) and a second thread (14) (an internal thread and a left-hand thread, and formed on a side where a bolt described later is inserted); a movable collar (20) having an external thread (a left-hand thread. A portion formed with the external thread is referred below to as a first thread (21)) capable of threading into the second thread (14) of the nut and formed on an outer peripheral surface of the substantially cylindrical-shaped body; and a bolt (40) (Here, the shape of its head (41) is differently depicted between in FIG. 1 and in FIG. 2 and between in FIG. 5 and in FIG. 6 but mutually adoptable configurations are merely depicted distinctively in the separate drawings.) having external threads (421, 422) (both being a right-hand thread. Hereinbelow, "thread" is a right-hand thread unless specified. In addition, the external thread (421) is a conventional thread while the external thread (422) is a special thread. The details thereof will be described later.) capable of threading into the first thread (13) of the nut and formed on an outer peripheral surface of its shank (42). In addition, the first thread (13) of the nut may be replaced by a conventional one (Concretely, a cavity conformed to the external shape of the conventional nut may be formed centrally of the flange (11) to permit the conventional nut to be fitted in and secured to the cavity or a cavity enabling the shank of the bolt to pass therethrough in a non-contact manner may be provided centrally of the flange and one surface of the conventional flange may be made to abut against and fix to one surface of the conventional nut.).

The movable collar (20) is constructed further in the following manner.

Figure 2:
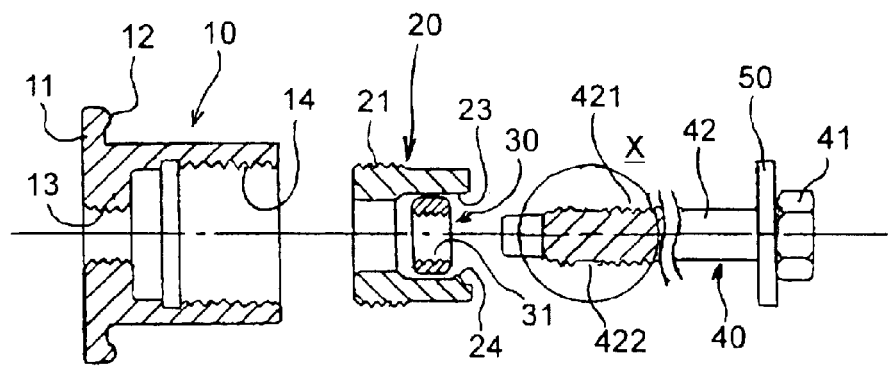
FIG. 2 is a partial, cross sectional view showing a second embodiment of the invention.

First embodiment (see FIG. 1)

An internal thread (Hereinbelow, a portion formed with such internal thread is referred to as a second thread (22).) capable of threading onto the external threads (421, 422) formed on the outer peripheral surface of the bolt is formed on an inner peripheral surface of the movable collar.

In addition, the movable collar (20) is shown as having a flange on an end surface of a body toward the bolt, which serves to provide a preferable seated condition (details of which is described later) of the movable collar on one (M2) of the members to be clamped). Of course, a configuration shown in FIG. 2 may serve in view of the purpose, for which a fastener according to the invention is intended.

Second embodiment (see FIG. 2) A portion (Hereinbelow, referred to as a torque transmitting nut latch (23)) corresponding to the second thread (22) of the movable collar defines a cavity having a cross section, which is similar to a torque transmitting nut (30) and capable of containing the torque transmitting nut so as to make an outer peripheral surface (Its cross section is polygonal, usually hexagonal) of the nut (30) abut against an inner surface of the cavity to an extent that rotation of the nut (30) can be substantially restricted. Here, a side of the torque transmitting nut latch toward the nut (10) is made a seat structure, on which the torque transmitting nut can be seated, while a side of the torque transmitting nut latch toward the bolt (40) is provided with a nut falling-off preventing pawl (24) to prevent falling-off of the torque transmitting nut (This nut falling-off preventing pawl (24) may be formed by applying "caulking" on at least a portion of an inner peripheral side end surface of the movable collar toward the nut (10) after the torque transmitting nut is received in the torque transmitting nut latch).

In addition, in this embodiment, the external threads (421, 422) formed on the outer peripheral surface of the bolt are formed to be capable of a thread (31) (internal thread) of the torque transmitting nut.

Further, while being commonly characteristic of the both embodiments, the external threads formed on the outer peripheral surface of the bolt are composed of a portion (421) (Hereinbelow, referred to as a first thread or a common thread ridge) having a flank angle of a common thread ridge (beta) (generally, 60 degrees) and a portion (422) (Hereinbelow, referred to as a second thread or a special thread ridge) having a special thread ridge shape or a thread configuration).

Figure 3:
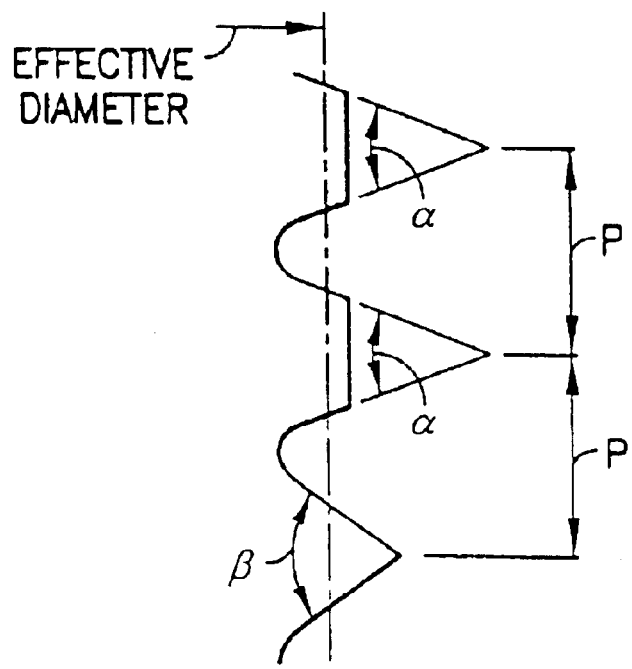
FIG. 3 is a partial, enlarged cross sectional view showing an embodiment of special thread ridge portion (portion denoted by X in FIGS. 1 and 2) of a bolt as a constituent element of the invention.

An example (Hereinbelow, referred to as a first embodiment of the special thread ridge) of such special thread ridge is shown in FIG. 3, and is concretely formed by subjecting a common thread ridge to compressive deformation in a diametrical direction. A flank angle (alpha) of the portions is naturally smaller (usually around 40 degrees) than the flank angle (beta) of a common thread ridge. Here, a range where the portions are formed suffices to be around 2 to 10 in terms of the number of thread ridges and around 10 to 90 degrees in terms of an angle about an axis. Also, the portions are at least two in number about the axis, of which a spacing is equal. However, the both portions (421, 422) have the same pitch P.

Figure 4:
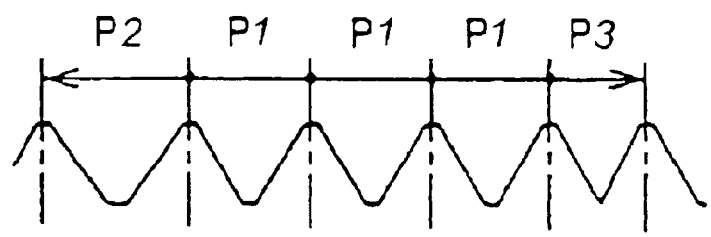
FIG. 4 is an enlarged cross sectional view showing a further embodiment of special thread ridge portion of a bolt as a constituent element of the invention.

Another embodiment (Hereinbelow, referred to as a second embodiment of the special thread ridge) of the special thread ridges (422) is shown in FIG. 4. In this embodiment, a pitch (P2) or (P3) of a part of the thread ridge is greater or less than that P1 of the common thread ridge (P2>P1>P3). An extension of and a range of such modification are around ±20% of P1 in terms of pitch and at least one thread ridge in +(plus) and −(minus) directions, respectively.

In addition, while being commonly characteristic of the both embodiments, it goes without saying that both the first and second embodiments of the special thread ridge are applicable not to the bolt (40) but to the second thread (22) of the movable collar (20) or the thread ridge of the torque transmitting nut (30).

As further embodiments of the special thread ridges (422), there are given a thin layer (it is preferable that once having been formed, it will not fall off from a location of formation as long as it is intentionally peeled off, and it will not be bonded to a member or members, to which the thin layer abuts against) of a resin (typified by "Nylok" (trade mark of Nylok Ltd., in the United States). While being natural, the thin layer may be formed on the second thread (22) of the movable collar (20) or threads of the torque transmitting nut (30) instead of being formed on the side of the bolt (40). Of course, formation of the thin layer (the case of being applied to the threads of the bolt (40) and the case of being applied to the side of the movable collar) may be performed in combination of adoption of the embodiments, in which the above-mentioned threads may be made special in shape or the pitch is changed. Hereinbelow, referred to as a third embodiment of the special thread ridge. In addition, formation of the thin layer may be performed in accordance with a conventional method, for example, methods described in, for example, U.S. patent application Nos. 371,604/1964 and 398,495/1964 (now U.S. Pat. No. 3,294, 139); 599,042/1966 and 628,683/1967 (now U.S. Pat. No. 3,498,352 and U.S. Pat. No. 3,579,684 which was reissued as Re.28,812); 821,178/1969 (now U.S. Pat. No. 3,554,258); 203,130/1971 (now U.S. Pat. No. 3,878,222); 314,854/1972 and 400,502/1973 (now U.S. Pat. No. 3,858,262 and U.S. Pat. No. 3,896,760), and U.S. Pat. Nos. 3,995,074; 4,054, 688; 4,100,882 and 4,120,993, such as special nylon, formed only on thread ridges of a portion, of which configuration, angle and pitch are the same as those of common thread ridges, and further formation of the special thread ridges (422) from an elastic body, for example, an elastomer resin (while being natural, instead of applying such formation to the bolt, the second thread (22) of the movable collar (20) or the torque transmitting nut (30) itself may be formed from an elastic body. Hereinbelow, referred to as a fourth embodiment of the special thread ridge. In addition, formation of the special thread ridge may be performed with the use of, for example, injection molding (including insert molding)) (not shown).

Also, while being commonly characteristic of the both embodiments, materials for constituent elements of a fastener according to the invention usually include alloys typified by carbon steel, stainless steel and light alloys, but an engineering plastic typified by polyamide and polyacetal may be applied to a part or the entire of the constituent elements as far as the manufacturing cost permits.

Figure 5:
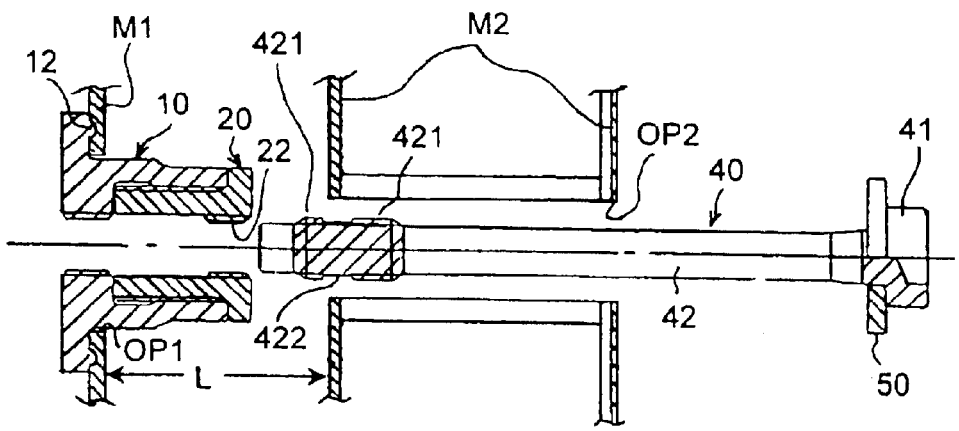
FIG. 5 is a partial, enlarged cross sectional view showing in a stepwise manner clamping actions of the first embodiment of the invention.
Figure 5:
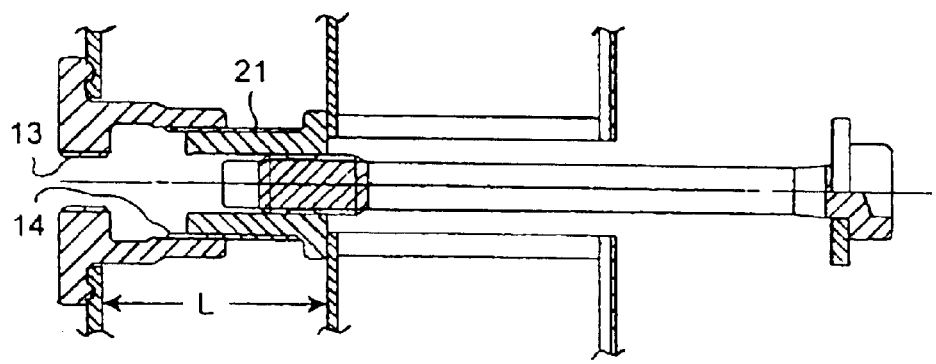
Figure 5:
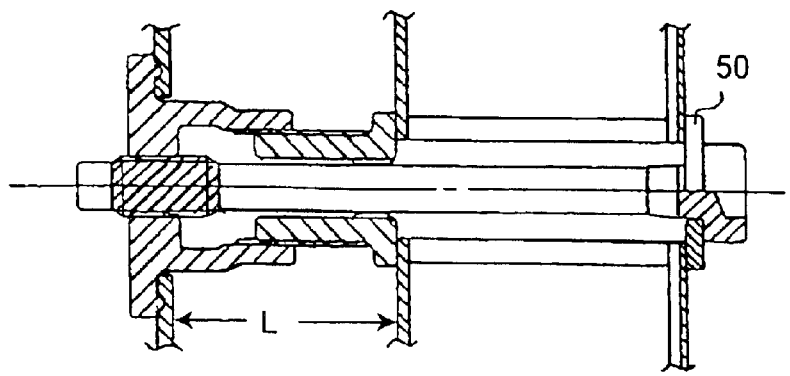

Next, the use of the fastener according to the invention will be explained on the basis of the first embodiment (See FIG. 5. An explanation will be given with respect to the case where the special thread ridges (422) of the bolt (40) are according to the first embodiment.).

1. Approach (see ① of FIG. 5)

The nut (10) with the movable collar (20) received in an inner bore thereof (in a state, in which the first thread (21) of the movable collar is threaded into the second thread (14) of the nut (10) to a maximum extent) is inserted into an opening (OP1) of one (M1) (for example, an inner panel of an automobile) of the members to be clamped, toward the bolt (40), and the nut is latched on the member to be clamped, so that one surface of the flange (11) of the nut comes into close contact with one surface of the member to be clamped (At least one recess capable of receiving therein a nut latch (12) may be beforehand provided in a corresponding position of the member to be clamped, and the nut latch may be fitted into and welded to the recess, or after the fitting of the nut latch, a side peripheral surface of the flange may be welded to the member to be clamped. Also, it is possible to adopt a method of melting or bonding the both surfaces depending upon a material used.). The main point is to enable forming a state, in which rotation of the nut about an axis thereof is restricted relative to one (M1) of the members to be clamped.

Figure 6:
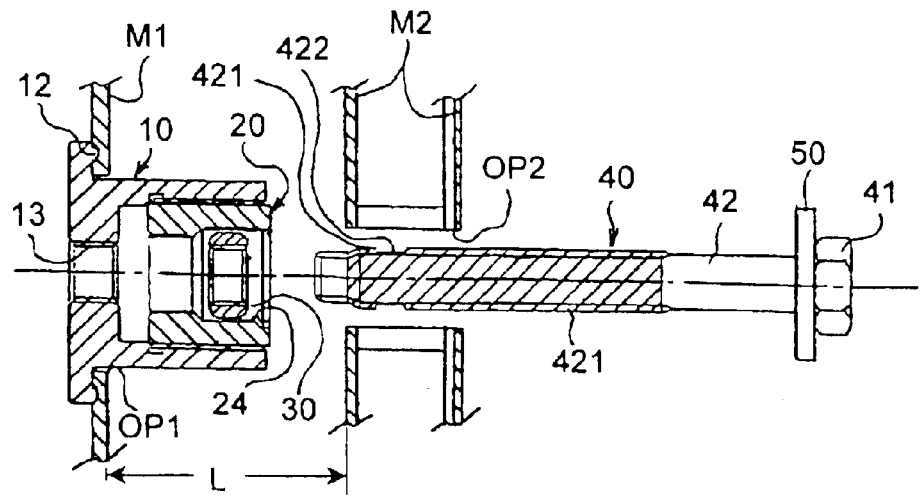
FIG. 6 is a partial, enlarged cross sectional view showing in a stepwise manner clamping actions of the second embodiment of the invention.
Figure 6:
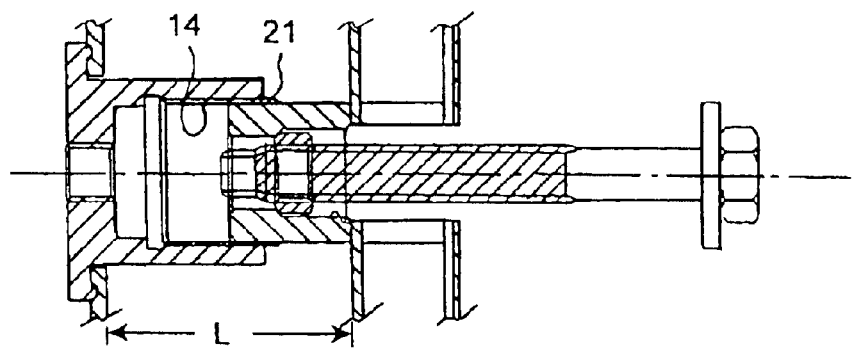
Figure 6:
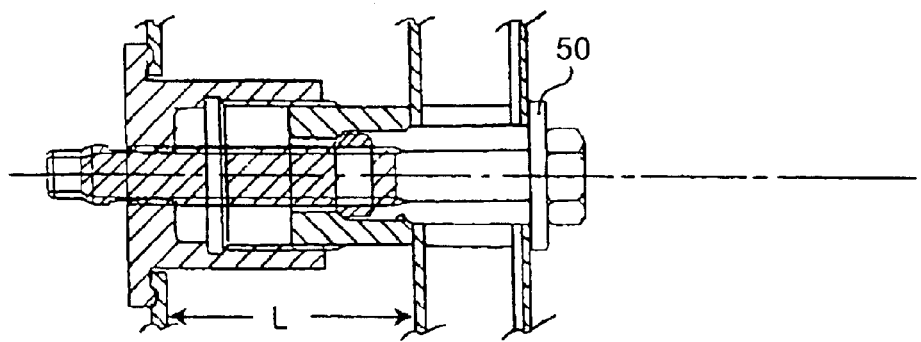

In addition, this step is the same as in the second embodiment (see ① of FIG. 6).

2. Until the seating of the movable collar (see ② of FIG. 5)

The second thread (422) of the bolt (40) inserted into an opening (OP2) of the other (M2) (for example, a body of an automobile) of the members to be clamped, toward the nut is threaded into the second thread (22) of the movable collar to rotate the bolt in a clockwise direction.

Here, since thread ridges of the second thread (422) of the bolt are formed such that their flank angle (alpha) is smaller than the flank angle (beta) of thread ridges (of which pitch is the same as that of thread ridges of the second thread (22) of the movable collar), frictional forces generated upon contact of flanks of the both threads with each other are substantially greater than those generated upon contact of flanks of the second thread (14) of the nut and the first thread (21) of the movable collar (of which threads are the same in angle and pitch) with each other (This state occurs similarly even when the configuration of the special thread ridges (422) is as in the second to fourth embodiments. Stated conversely, an arrangement for producing such state is concretely illustrated in the first to fourth embodiments.). As a result, the movable collar begins to rotate together with the bolt and comes forth along an axis from the nut toward the other (M2) of the members to be clamped (the first thread (21) of the movable collar and the second thread (14) of the nut are formed with left-hand threads).

Finally, an end surface of the flange provided on an end of the movable collar toward the bolt is brought into contact with the other (M2) of the members to be clamped, so that movement (movement toward the other (M2) of the members to be clamped) of the movable collar in an axial direction is stopped.

In addition, this step (see ② of FIG. 6) in the second embodiment is different from that in the first embodiment only in that mutual contact of the flanks of the second thread (22) of the movable collar and of the second thread (422) of the bolt is replaced with mutual contact of the flanks of the thread (31) of the torque transmitting nut (30) received in the torque transmitting nut latch (23) and of the second thread (422) of the bolt and torque of the bolt is transmitted to the movable collar through the torque transmitting nut (As described above, the end surface of the movable collar toward the bolt may be further provided with a flange as in the first embodiment. The same is said of other respects.) but is the same as in the first embodiment in axial movements of the movable collar toward the other (M2) of the members to be clamped, upon the clockwise rotation of the bolt. Here, the reason why the torque transmitting nut (30) is somewhat loosely received in the torque transmitting nut latch (23) of the movable collar in a manner to present some play in a diametrical direction (Consequently, the torque transmitting nut is allowed to rotate a part of one revolution about its axis in the torque transmitting nut latch) resides in the consideration of the ability of absorbing an angle and/or deviation of axes between a direction, in which the bolt is inserted, and the axis of the movable collar (Naturally, an operation of charging the torque transmitting nut into the torque transmitting nut latch is easy).

3. Until completion of clamping (see ③ of FIG. 5)

Further, the bolt (40) is rotated in a clockwise direction (Torque against frictional force forced on the second thread (422) of the bolt upon contact of the end surface of the flange provided on the movable collar toward the bolt with the other (M2) of the members to be clamped is applied to the head (41) of the bolt), and the bolt is advanced in the inner bore of the nut toward the first thread (13) of the nut.

Finally, the first thread (421) or the second thread (422) of the bolt is threaded into the first thread (13) of the nut, and the clamping operation is terminated by continuing rotation of the bolt until a bottom surface (a surface on a tip end side of the bolt) of the head (41) of the bolt is brought into contact with the other (M2) of the members to be clamped, with a washer (50) therebetween.

In addition, this step is the same also in the second embodiment (see ③ of FIG. 6).

In this manner, when the fastener according to the invention is used to provide clamping with a spacing (L) (This spacing will not change in the clamping operation.) between members to be clamped, some possible scatter in the spacing can be absorbed by axial displacements of the movable collar, so that a clamping operation in a substantially wide range can be performed by appropriately setting axial lengths of a main portion of the movable collar and of a main portion of the nut.

While being common to the first embodiment and the second embodiment, various contrivances similar to that applied to the special thread ridges (422) of the bolt may be additionally applied to either of the second thread (14) of the nut or the first thread (21) of the movable collar within a range over which they can be threaded each other at the time of completion of clamping. At the time of completion of clamping, loosening of the movable collar will be usually prevented by axial forces generated by threading the thread of the bolt into the first thread (13) of the nut (In particular, loosening of the movable collar is more effectively prevented in the case where the thread of the bolt threaded into the first thread (13) of the nut is set to comprise the special thread ridges (422)). When the fastener according to the invention is used under a circumstance suffering repeated vibrations, for example, in the case where a member of a certain kind must be mounted to a body of an automobile, mutual frictional contact of the flanks of the second thread (14) of the nut and the first thread (21) of the movable collar displays the effect of directly suppressing loosening of the movable collar itself. In addition, in the first embodiment, the same effect can be obtained by applying various contrivances similar to that applied to the special thread ridges (422) of the bolt, to either of the thread of the bolt or the second thread (22) of the movable collar within a range over which they can be threaded each other at the time of completion of clamping.

INDUSTRIAL APPLICABILITY

As described above, since the fastener according to the invention comprise in combination constituent elements of simple structure, manufacture thereof does not require any special work and since the clamping operation relies on rotational motion of a bolt as one constituent element, any complicated manipulation is not required of an operator. The fastener according to the invention will not forcedly shorten a spacing (L) between members to be clamped each other and can readily perform clamping while absorbing some possible scatter in the spacing.

What is claimed is:

1. A fastener comprising a bolt, a nut, and a movable collar, wherein the bolt comprises a bolt head and a bolt shank, the bolt shank extending from the bolt head and having external threads thereon, wherein the nut comprises a first nut engaging portion for engagement with the external threads of the bolt shank, and a second nut engaging portion for engagement with the movable collar, the second nut engaging portion being integrally formed with the first hut engaging portion, wherein the nut is capable of being threaded onto the bolt through the first nut engaging portion, wherein the movable collar comprises a first collar engaging portion for engagement with the external threads of the bolt shank, and a second collar engaging portion for engagement with the second nut engaging portion of the nut, wherein the movable collar is capable of being threaded onto the bolt through the first collar engaging portion and is capable of being threaded into the nut through the second collar engaging portion and the second nut engaging portion, wherein the second collar engaging portion comprises an external thread forming portion formed with an external thread of an opposite hand with respect to the external thread formed on the bolt shank, wherein the nut comprises an extended cylindrical-shaped portion extended in an axial direction and having an extended outer-peripheral surface and an extended inner-peripheral surface, the extended cylindrical-shaped portion comprising a cavity defined by the extended inner-peripheral surface, the extended inner-peripheral surface comprising an internal thread forming said second nut engaging portion for threading onto the external thread formed on the second collar engaging portion, and, one end of the cylindrical-shaped portion having a flange formed as a single piece with the cylindrical-shaped portion, the flange having a central opening forming said first nut engaging portion, wherein the movable collar is receivable in the cavity when it is threaded and inserted into the nut, and wherein, with the movable collar being received in the cavity, the second nut engaging portion of the nut is inserted through an opening formed in one of two members formed with openings, and the bolt is threaded into the movable collar through the opening formed in the other of the two members and then torque is applied to the bolt head, the movable collar is extended toward the other of the two members from the cavity and the nut is threaded onto the bolt through the first nut engaging portion, whereby the one of the two members is latched on the nut and the other of the two members is latched on the movable collar, so that the two members are fastened by the bolt head, the nut, and the movable collar.

2. The fastener according to claim 1, wherein the bolt shank comprises a small-diameter portion having a diameter smaller than the diameter of the external threads.

3. The fastener according to claim 1, wherein the external thread of the bolt shank comprises thread ridges, engagement of which with the first collar engaging portion is cancelled by torque of at least a predetermined value.

4. The fastener according to claim 1, wherein the external thread of the bolt shank has a thread ridge shape obtained by radially compressing crests of thread ridges of the external thread.

5. The fastener according to claim 1, wherein thread ridges of the external thread of the bolt shank have a greater pitch than a pitch of thread ridges of the external thread.

6. The fastener according to claim 1, wherein the external thread of the bolt shank is formed with the same thread ridges as those of the external thread and a thin layer of a special nylon resin is formed on the thread ridges.

7. The fastener according to claim 1, wherein the external thread comprises thread ridges formed of an elastic body.

* * * * *